United States Patent [19]

Danielson et al.

[11] 4,454,387

[45] Jun. 12, 1984

[54] HANDSET HANGER AND SWITCH

[75] Inventors: Richard J. Danielson, Monroe, N.Y.; John E. Marquart, Northvale, N.J.

[73] Assignee: Roanwell Corporation, New York, N.Y.

[21] Appl. No.: 334,065

[22] Filed: Dec. 23, 1981

[51] Int. Cl.³ ............... H04M 1/04; H04M 1/02; H04M 1/06

[52] U.S. Cl. ............... 179/146 R; 179/100 C; 179/147; 179/159; 179/167

[58] Field of Search ............ 179/146 R, 147, 159, 179/100 C, 100 R, 103, 159, 167, 153, 178; 24/247, 3 J, 3 L, 259 R; D8/354; 200/293, 294, 295, 296, 153 T, 330; 248/27.3; 455/89, 90, 346

[56] References Cited

U.S. PATENT DOCUMENTS

| | | | |
|---|---|---|---|
| 2,916,563 | 12/1959 | Bernstein | 179/159 |
| 3,005,061 | 10/1961 | Cagen | 179/146 R |
| 3,878,343 | 4/1975 | Van De Wall | 179/100 R |

FOREIGN PATENT DOCUMENTS 570932  8/1977  U.S.S.R. .................. 179/159

Primary Examiner—Harold I. Pitts
Assistant Examiner—Danita R. Byrd

[57] ABSTRACT

This telephone handset hanger is intended particularly for use on a vehicle. It includes a simplified and strengthened spring mechanism for holding the handset in place and an improved switch actuating mechanism.

4 Claims, 5 Drawing Figures

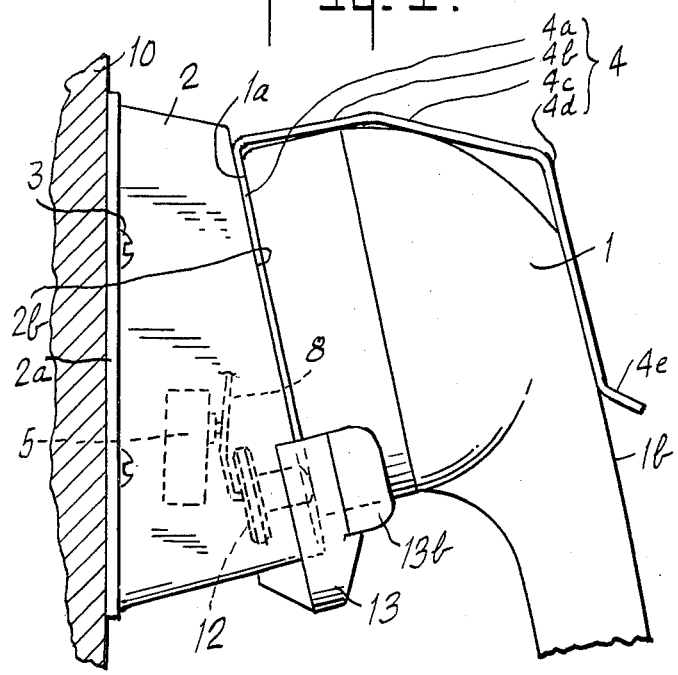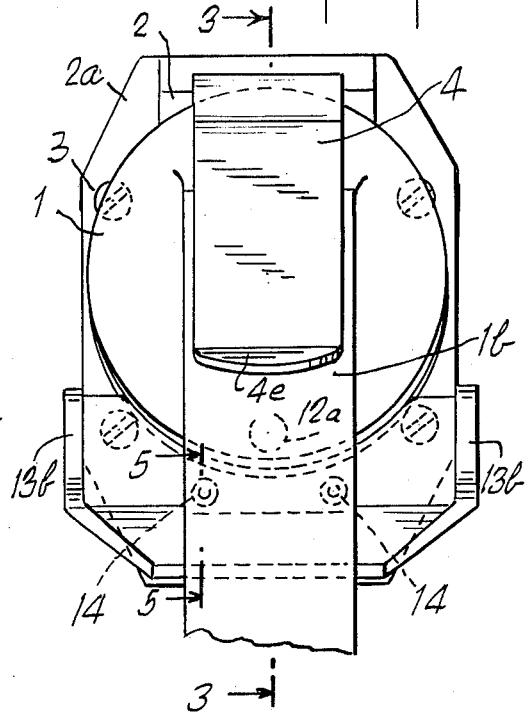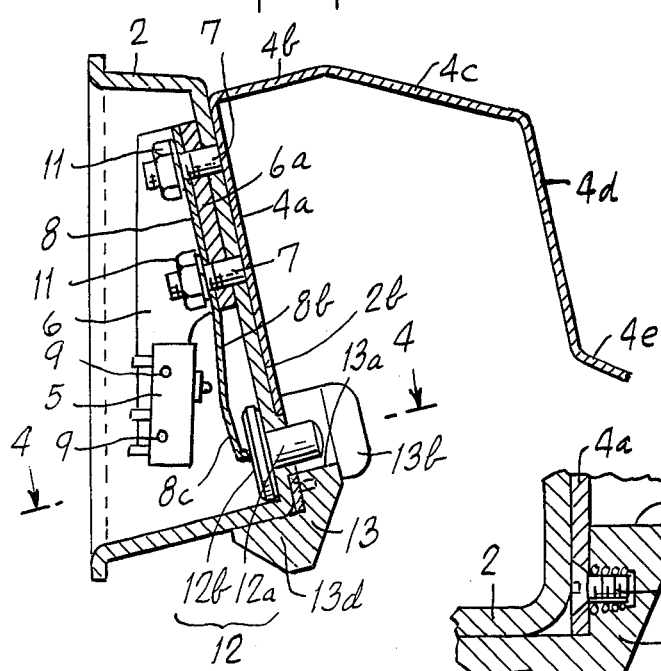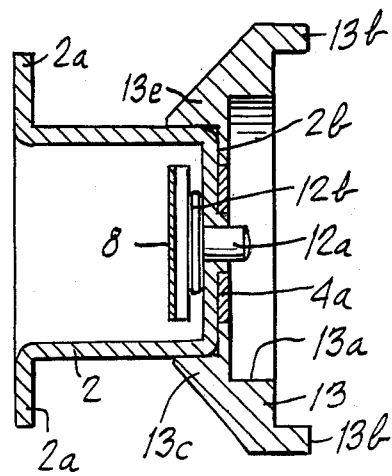

HANDSET HANGER AND SWITCH

CROSS-REFERENCE

This invention is an improvement on the devices shown in the U.S. patents to Sears, No. 2,443,329 and Cagen, No. 3,005,061.

BRIEF SUMMARY

This hanger is intended for use on vehicles, including both land vehicles, ships, and aircraft. This hanger for a telephone handset includes a simplified and strengthened spring mechanism for holding the handset in place. The hanger is intended to hold the handset fixed in position against vibration and movement such as may be encountered in moving vehicles. The hanger also includes an improved switch actuating mechanism which makes the switch actuation more positive.

DRAWINGS

FIG. 1 is a side elevational view of a handset hanger embodying the invention, only a fragment of the handset being shown.

FIG. 2 is a right-hand elevation of the handset hanger appearing in FIG. 1.

FIG. 3 is a cross-sectional view taken on the line 3—3 of FIG. 2, with the handset omitted.

FIG. 4 is a sectional view taken on the line 4—4 of FIG. 3.

FIG. 5 is a fragmentary sectional view taken on the line 5—5 of FIG. 2.

DETAILED DESCRIPTION

The hanger is intended for use with a conventional telephone handset such as shown at 1 in FIGS. 1 and 2. The handset has at one end an operating front face 1a, typically the face of the receiver of the handset. The opposite face of the receiver of the handset has a surface 1b which is substantially rectilinear when viewed in cross-section, and of substantial lateral extent, as viewed in FIG. 2.

The hanger includes a casing 2 adapted for mounting on a vertical surface such as a wall 10, shown in FIG. 1. For that purpose, the casing 2 is provided with flanges 2a attached to the wall by means of screws 3. The casing 2 has a front surface 2b, which has a substantial extent upwardly and downwardly. In the embodiment illustrated, the lower end of the surface 2b extends farther out from the wall 10 than the upper end, so that the surface 2b is diagonal with respect to the vertical wall 10.

A spring member 4 consists of a single integral elongated flat strip of yieldable material having a first portion 4a which abuts against the front face of the casing 2, a second portion 4b, 4c, which extends outwardly from the surface 2b and a third portion 4d which extends downwardly, generally parallel to the surface 2b. The portion 4d terminates in an outwardly projecting finger 4e. The spring member 4 has a substantially constant width throughout its length, except for the finger 4e which is rounded, as best seen in FIG. 2.

The second portion 4b, 4c of the spring member 4 includes a part 4b extending at right angles to the portion 4a and a part 4c extending diagonally downward from the outer end of part 4b to the portion 4d. The spring member would be just as functionally effective if the part 4c was a straight extension of part 4b, at right angles to the portion 4a of the spring member 4 and to the portion 4d. However, such a configuration would take up more space than the configuration shown. Where the telephone is to be used on a land vehicle, ship, or aircraft space is limited, and the configuration shown is therefore greatly preferred.

A switch means 5 is mounted within the casing 2 and may consist of a plurality of microswitches fastened between the arms of a U-shaped frame 6 by a pair of pins 9. Welded to the underside of the portion 4a of the spring 4 are two studs 7 which extend through the front wall of casing 2, through the bight 6a of the frame 6 and through a leaf spring 8. A pair of nuts 11 are threaded on the studs and hold the spring member 4, the casing 2, the frame 6 and leaf spring 8 in their proper assembled relationship. An actuator 12 for the switch means 5 includes a button 12a extending outwardly through an aperture in the wall of the casing 2 and a flange 12b which engages the inner surface of that wall when the switch is in its outer position.

An abutment 13 is located at the lower end of the first portion 4a of the spring member 4, being fastened thereto by screws 14. The abutment 13 has a central arcuate recess 13a in its upper surface which is adapted to engage the arcuate surface of the receiver end of the handset 1. At its lateral ends, the abutment is provided with outwardly extending wings 13b which serve to engage the sides of the receiver end of the handset and guide it when it is being inserted into the hanger.

The abutment 13 extends below the bottom of the casing 2, as shown in FIGS. 3 and 5, and also extends toward the flanges 2a, as shown at 13c and 13e in FIG. 4, beyond the edges of the front surface 2b of the casing 2. The extensions 13c and 13e cooperate with the wings 13b as the handset 1 is being inserted into the hanger. Any lateral force acting on one of the wings 13b, due to an accidental misdirection of the handset 1, is transferred through one of the extensions 13c and 13e to the casing 2. The particular one of extensions 13c and 13e which may be involved depends upon the direction of the force being opposed. (Note that FIG. 4 is rotated counterclockwise 90° as compared to FIG. 2). If the lateral force is to the right as viewed in FIG. 2, (upward in FIG. 4), it is transferred to casing 2 through extension 13c. If the lateral force is to the left as viewed in FIG. 2 (downward in FIG. 4), it is transferred through extension 13e. Consequently, the screws 14 do not have to provide the entire resistance to the forces encountered during insertion of the handset. Similarly, the downward extension of the abutment 13, as shown at 13d in FIGS. 3 and 5, engages the lower side of casing 2 and resists an upward force on that abutment during insertion of the handset, so that the screws 14 are assisted in resisting such upward forces.

The leaf spring 8 includes a flat portion clamped by the nuts 11 against the frame 6, an intermediate portion 8b extending in cooperative relationship to the actuating buttons on the microswitches 5, and an end portion 8c which is turned through an angle of about 90° and has a tip abutting against the switch actuator 12. The spring 8 holds the actuator 12 in the outward position shown in FIG. 4 when there is no handset in the hanger.

The leaf spring 8 has a spring rate substantially greater than that of the biasing means in the microswitches 5, so that the force required to move the switch actuator 12 inwardly is substantially constant, being determined principally by the spring rate of leaf spring 8, with only a relatively small increase in spring rate encountered when the leaf spring 8 engages the buttons of the microswitches 5.

The distance between the recess 13a in the abutment 13 and the portion 4b of the spring member 4 is chosen so as to snugly receive the receiver end of the handset. The distance from the abutment 13 to the portion 4d of the spring member 4 is somewhat smaller than the distance between the front face 1a of the handset and the posterior surface 1b thereof. When the handset 1 is being inserted into the hanger its posterior surface 1b engages the spring member 4, usually first at the finger 4e. The face 1a of the handset is thereby pushed into engagement with the abutment 13. Continued upward movement of the handset into the hanger deflects the spring member 4 outwardly. The spring 4 maintains a pressure on the handset to force it toward the face 2b of the casing. As soon as the lower end of the receiver end of the handset has passed the abutment 13, it is pushed forcibly into the position shown in FIG. 1 by the spring member 4, thereby moving the actuator 12 to its inner position and forcing the leaf spring 8 against the operating buttons of the microswitches 5.

To remove the handset from the hanger, it is necessary to move the handle of the handset outwardly. In other words, the lower part of the handset, as it appears in FIG. 1, must be moved to the right. This movement must continue until the spring member 4 is deflected sufficiently for the lower end of the receiver to clear the abutment 13. Thereupon the handset may be slid outwardly between the spring member 4 and the abutment 13, with only frictional resistance.

Since the studs 7 are welded to the back surface of the portion 4a of the spring member 4, the surface of that member which engages the receiver of the handset is completely smooth. In the prior art hangers, the rivet heads in the corresponding surface sometimes, in the course of normal wear, projected outside the surface and tended to score the surface of the receiver as it was moved in and out of the hanger.

The lower end of the portion 4d of the spring member 4 is located in substantial alignment with the actuator 12. Because of this alignment, the operation of the actuator 12 is more positive than in the devices of the prior art, where a carelessly inserted handset might come to a stable position of rest against the abutment, without actuating the switch. This was particularly true of worn handsets and hangers, which might have developed flattened surfaces in critical areas.

We claim:

1. A hanger for a telephone handset having at one end an operating front face of fixed dimensions and a posterior surface disposed at a fixed distance from the front face, said hanger including:
   a. a casing adapted for mounting on a vertical surface and having a generally upwardly and downwardly extending front surface spaced from said vertical surface when the casing is mounted thereon;
   b. spring means having a first portion mounted so as to abut said upwardly and downwardly extending surface, a second portion extending outwardly from the upper end of said first portion and a third portion extending downwardly from the outer end of said portion;
   c. switch means within said casing;
   d. an actuator for said switch means projecting outwardly through said front surface, said actuator being biased to a first position in which it extends outwardly substantially beyond said front surface, and being movable against its bias to a second position in which its outer end is aligned with the front surface; and
   e. an abutment extending outwardly beyond the lower end of the first portion of the spring means, said abutment being spaced from the second portion of the spring means by a distance sufficient to receive said one end of the handset housing snugly, and being spaced from the third portion of the spring means by a distance smaller than the corresponding dimension of the housing of the telephone handset to be supported on the hanger, so that said telephone handset may be mounted on the hanger by moving said one end between said abutment and said third portion, thereby deflecting the spring means, until said one end is received between the abutment and the second and third portion of the spring means, said housing of the handset being then biased by the spring means to engage said switch actuator and move it to its second position when the handset is inserted past said abutment;

wherein the improvement comprises:
   f. said spring means is a single integral flat strip member of yieldable material having substantially constant width, with bends separating said portions, and said third portion extends downwardly to a position aligned with the actuator for the switch means.

2. A telephone handset hanger as in claim 1, in which said second portion of the spring member includes a first section extending at right angles to the first portion for a distance slightly greater than the corresponding dimension of the handset, and a second section extending diagonally downward from the outer end of said first section to said third portion.

3. A telephone handset hanger as in claim 1, in which:
   a. said posterior surface of the handset has a rectilinear cross-section; and
   b. said third portion has a smooth, uninterrupted surface on which the posterior surface of the handset slides during insertion and removal.

4. A telephone handset hanger having at one end an operating front face of fixed dimensions and a posterior surface disposed at a fixed distance from the front face, said hanger including:
   a. a casing adapted for mounting on a vertical surface and having a generally upwardly and downwardly extending front surface spaced from said vertical surface when the casing is mounted thereon;
   b. spring means having a first portion mounted so as to abut said upwardly and downwardly extending surface, a second portion extending outwardly from the upper end of said first portion and a third portion extending downwardly from the outer end of said second portion;
   c. switch means within said casing;
   d. an actuator for said switch means projecting outwardly through said front surface, said actuator being biased to a first position in which it extends outwardly substantially beyond said front surface, and being movable against its bias to a second position in which its outer end is aligned with the front surface; and
   e. an abutment extending outwardly beyond the lower end of the first portion of the spring means, said abutment being spaced from the second portion of the spring means by a distance sufficient to receive said one end of the handset housing snugly, and being spaced from the third portion of the spring means by a distance smaller than the corresponding dimension of the housing of the telephone handset to be supported on the hanger, so that said telephone handset may be mounted on the hanger by moving said one end between said abutment and said third portion, thereby deflecting the spring means, until said one end is received between the abutment and the second and third portions of the spring means, said housing of the handset being then biased by the spring means to engage said switch actuator and move it to its second position when the handset housing is inserted past said abutment;

f. a leaf spring mounted on the inside of the casing and biasing the actuator outwardly;

g. said switch means being mounted inside the casing for actuation by the leaf spring, said switch means being biased toward the leaf spring with a spring rate substantially lower than that of the leaf spring, so that the force required to move the switch actuator inwardly is substantially constant, as determined by the spring rate of the leaf spring;

h. studs fixed on the under side of the first portion of the spring means and extending into the casing;

i. a generally U-shaped frame having the bight of the U received on said studs;

j. said switch means being supported between the arms of the U-shaped frame; and k. nuts on the studs for holding the spring member, the casing and the frame assembled, said leaf spring including a flat portion held in place against said frame by said studs and nuts, a second portion extending inwardly of the casing to a position adjacent the switch means and a third portion extending outwardly from said second portion and terminating adjacent said switch actuator for movement thereby.

* * * * *